US012602461B2

(12) United States Patent
Imanishi et al.

(10) Patent No.: US 12,602,461 B2
(45) Date of Patent: Apr. 14, 2026

(54) INFORMATION PROCESSING SYSTEM, INFORMATION PROCESSING METHOD, AND COMPUTER-READABLE STORAGE MEDIUM

(71) Applicant: NEC Corporation, Tokyo (JP)

(72) Inventors: Yoshiko Imanishi, Tokyo (JP); Toru Aoyagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 24 days.

(21) Appl. No.: 18/291,298

(22) PCT Filed: Jan. 17, 2022

(86) PCT No.: PCT/JP2022/001296
§ 371 (c)(1),
(2) Date: Jan. 23, 2024

(87) PCT Pub. No.: WO2023/007768
PCT Pub. Date: Feb. 2, 2023

(65) Prior Publication Data
US 2024/0362307 A1      Oct. 31, 2024

(30) Foreign Application Priority Data

Jul. 30, 2021      (JP) ................................. 2021-125258

(51) Int. Cl.
*G06F 21/32*          (2013.01)
*G06F 21/33*          (2013.01)
(52) U.S. Cl.
CPC .............. *G06F 21/32* (2013.01); *G06F 21/33* (2013.01)
(58) Field of Classification Search
CPC ....... G06F 21/32; G06F 21/33; H04L 63/0861
See application file for complete search history.

(56) References Cited

U.S. PATENT DOCUMENTS

2001/0034836 A1* 10/2001 Matsumoto ........... H04L 9/3231
713/176
2011/0012711 A1* 1/2011 Abe ...................... G07F 7/1008
340/5.82
(Continued)

FOREIGN PATENT DOCUMENTS

JP        2000-311220 A      11/2000
JP        2006-048263 A      2/2006
(Continued)

OTHER PUBLICATIONS

International Search Report for PCT Application No. PCT/JP2022/001296, mailed on Apr. 5, 2022.
(Continued)

*Primary Examiner* — Shanto Abedin
(74) *Attorney, Agent, or Firm* — Sughrue Mion, PLLC

(57)          ABSTRACT

An information processing system according to one embodiment of the present disclosure is equipped with: an acquisition unit for acquiring first biological information, which is information pertaining to the living body of a user and is retrieved from a user terminal in which certification information is installed, which is information pertaining to a public certificate of the user, and second biological information which is information pertaining to the living body of the user and is associated with the certification information; an authentication unit for subjecting the user to biological authentication on the basis of the first biological information and the second biological information; a registration unit for registering the information pertaining to the user which was authenticated by the biological authentication; and a service provision unit which provides a service to the user according to a request from the user terminal when information pertaining to the user is registered.

11 Claims, 16 Drawing Sheets

(56)                References Cited

U.S. PATENT DOCUMENTS

| | | | | |
|---|---|---|---|---|
| 2011/0016327 | A1* | 1/2011 | Suzuki | H04L 63/0861 |
| | | | | 713/186 |
| 2015/0128231 | A1* | 5/2015 | Nakajima | H04L 63/0876 |
| | | | | 726/5 |
| 2015/0200935 | A1* | 7/2015 | Ikeda | H04L 63/0861 |
| | | | | 726/7 |
| 2018/0181739 | A1* | 6/2018 | Zhong | H04L 9/3247 |
| 2021/0342433 | A1* | 11/2021 | Fujita | G06Q 20/3224 |
| 2022/0239490 | A1* | 7/2022 | Maruyama | G06F 21/6245 |
| 2023/0124782 | A1* | 4/2023 | Tanabe | G06Q 30/06 |
| | | | | 726/2 |
| 2024/0205220 | A1* | 6/2024 | Yoshiwara | H04L 63/083 |

FOREIGN PATENT DOCUMENTS

| | | |
|---|---|---|
| JP | 2007-230404 A | 9/2007 |
| JP | 2012-164030 A | 8/2012 |
| JP | 2013-004064 A | 1/2013 |
| JP | 2017-102842 A | 6/2017 |
| JP | 2020-087461 A | 6/2020 |
| JP | 2020-113107 A | 7/2020 |
| JP | 2020-177288 A | 10/2020 |
| JP | 6908200 B | 7/2021 |
| WO | 2004/050437 A1 | 6/2004 |

OTHER PUBLICATIONS

English translation of Written opinion for PCT Application No. PCT/JP2022/001296, mailed on Apr. 5, 2022.

NPA explanatory material, Nov. 2020, pp. 1-3, [Search date Mar. 28, 2022], Internet: <http://web.archive,org/web/20201119061611/https://www.kantei.go.jp/jp/singi/it2/dgov/kaizen_wg/dai4/siryou4.pdf>, pp. 1-3, Specifically, pp. 3.

JP Office Action for JP Application No. 2024-194884, mailed on Nov. 11, 2025 with English Translation.

JP Office Action for JP Application No. 2024-194884, mailed on Feb. 3, 2026 with English Translation,.

* cited by examiner

INFORMATION PROCESSING SYSTEM 1000

SERVER 200

USER TERMINAL 100

1000

ACQUISITION UNIT — 110

AUTHENTICATION UNIT — 120

REGISTRATION UNIT — 130

SERVICE PROVIDING UNIT — 140

INFORMATION PROCESSING SYSTEM

Fig.4

INFORMATION PROCESSING SYSTEM 1000

200

SERVER

AUTHENTICATION UNIT 120

REGISTRATION UNIT 130

SERVICE PROVIDING UNIT 140

STORAGE DEVICE 29

100

USER TERMINAL

READING UNIT 10

INPUT UNIT 11

OUTPUT UNIT 12

ACQUISITION UNIT 110

STORAGE DEVICE 19

Fig.6

| IDENTIFICATION INFORMATION | NAME | GENDER | DATE OF BIRTH | ADDRESS | EMAIL ADDRESS | CREDIT CARD | CAPTURED IMAGE | AUTHENTICATION LEVEL |
|---|---|---|---|---|---|---|---|---|
| 001 | TARO TANAKA | MALE | 1992/1/1 | ··· KANAGAWA PREFECTURE | ABC@··· | 123··· | IMAGE A.jpg | 2 |

Fig.7

| AUTHENTICATION LEVEL | AUTHENTICATION METHOD | SERVICE |
|---|---|---|
| 2 | BIOMETRIC AUTHENTICATION USING CERTIFICATE INFORMATION | POINT, RESERVATION, ORDER, SETTLEMENT |
| 1 | OTHER AUTHENTICATION | POINT, ORDER |
| 0 | NO AUTHENTICATION | POINT |

INFORMATION PROCESSING SYSTEM 1000

200

120 AUTHENTICATION UNIT

130 REGISTRATION UNIT

140 SERVICE PROVIDING UNIT

150 SECOND AUTHENTICATION UNIT

29 STORAGE DEVICE

SERVER

100

10 READING UNIT

11 INPUT UNIT

12 OUTPUT UNIT

110 ACQUISITION UNIT

19 STORAGE DEVICE

USER TERMINAL

DELIVERY PERSON TERMINAL 400

SERVER 200

USER TERMINAL 100

STORE TERMINAL 300

INFORMATION PROCESSING SYSTEM, INFORMATION PROCESSING METHOD, AND COMPUTER-READABLE STORAGE MEDIUM

This application is a National Stage Entry of PCT/JP2022/001296 filed on Jan. 17, 2022, which claims priority from JP Patent Application 2021-125258 filed on Jul. 30, 2021, the contents of all of which are incorporated herein by reference, in their entirety.

TECHNICAL FIELD

The present disclosure relates to an identity verification technique for a user.

BACKGROUND ART

Various services may be performed using a terminal owned by a user. For example, PTL 1 discloses a technique of acquiring position information about a terminal owned by a user and paying a user's meal fee in a case where the user is away from a predetermined area of a restaurant by a predetermined distance or more. PTL 2 discloses a technique of giving a point generated at the time of product purchase using user identification information read from a user's portable terminal.

In some cases, identity verification is performed on a user who desires to use such a service. As a technique related to user identity verification, PTL 3 discloses a technique for authenticating a user by acquiring authentication information about the user from an external server and transmitting the acquired authentication information to an authentication server.

CITATION LIST

Patent Literature

PTL 1: JP 2020-177288 A
PTL 2: JP 2013-004064 A
PTL 3: JP 2017-102842 A

SUMMARY OF INVENTION

Technical Problem

It is conceivable that the user who desires to use the service as described above performs user registration in advance. Strict identity verification is required at the time of user registration.

In the technique disclosed in PTL 3, a processing device operated by a user acquires authentication information about the user from an external server via a terminal operated by the user, and the processing device transmits the authentication information to the authentication server. As described above, in the technique disclosed in PTL 3, the user is required to own a plurality of devices and operate the plurality of devices in order to verify the identity verification of the user. In other words, the technique may impose a burden on the user.

PTLs 1 and 2 do not disclose a description related to identity verification of a user.

The present disclosure has been made in view of the above problems, and an object of the present disclosure is to provide an information processing system and the like capable of strictly performing user identity verification of a user when using a service, while suppressing the burden imposed on the user.

Solution to Problem

An information processing system according to an embodiment of the present disclosure includes an acquisition means that acquires first biometric information that is information about a living body of a user, the first biometric information being read by a user terminal equipped with certificate information that is information about a public certificate of the user, and second biometric information that is information about a living body of the user, the second biometric information being associated with the certificate information, an authentication means that performs biometric authentication on the user based on the first biometric information and the second biometric information, a registration means that registers information about the user authenticated by the biometric authentication, and a service providing means that provides a service to the user in response to a request from the user terminal in a case where the information about the user is registered.

An information processing method according to an embodiment of the present disclosure includes acquiring first biometric information that is information about a living body of a user, the first biometric information being read by a user terminal equipped with certificate information that is information about a public certificate of the user, and second biometric information that is information about a living body of the user, the second biometric information being associated with the certificate information, performing biometric authentication on the user based on the first biometric information and the second biometric information, registering information about the user authenticated by the biometric authentication, and providing a service to the user in response to a request from the user terminal in a case where the information about the user is registered.

A computer-readable storage medium according to an embodiment of the present disclosure stores a program for causing a computer to execute the steps of acquiring first biometric information that is information about a living body of a user, the first biometric information being read by a user terminal equipped with certificate information that is information about a public certificate of the user, and second biometric information that is information about a living body of the user, the second biometric information being associated with the certificate information, performing biometric authentication on the user based on the first biometric information and the second biometric information, registering information about the user authenticated by the biometric authentication, and providing a service to the user in response to a request from the user terminal in a case where the information about the user is registered.

Advantageous Effects of Invention

According to the present disclosure, it is possible to strictly perform identity verification of a user when using a service while suppressing a burden on the user.

BRIEF DESCRIPTION OF DRAWINGS

FIG. 4 is a diagram schematically illustrating an example of a configuration of an information processing system according to the second example embodiment.

FIG. 6 is a diagram illustrating an example of information about a user according to the second example embodiment.

FIG. 7 is a diagram illustrating an example of a relationship between an authentication level and a service to be provided according to the second example embodiment.

EXAMPLE EMBODIMENT

Hereinafter, example embodiments of the present disclosure will be described with reference to the drawings.

First Example Embodiment

An outline of an information processing system according to the first example embodiment will be described.

Figure 1:
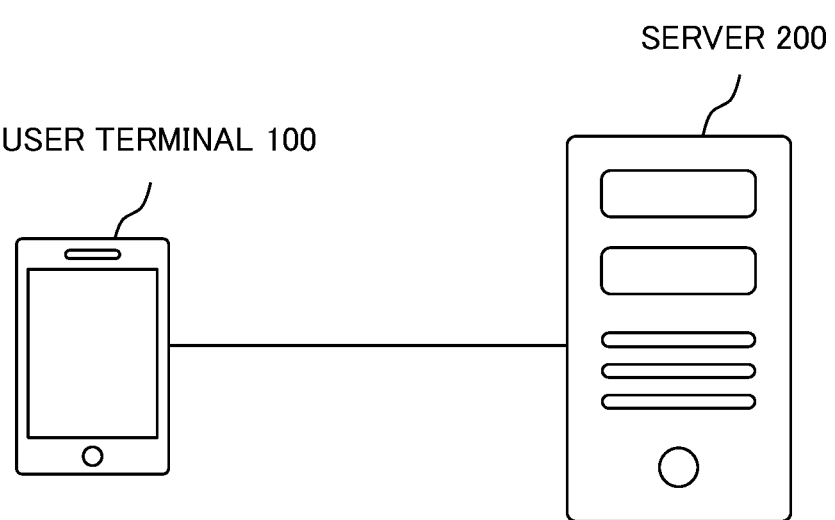
FIG. 1 is a diagram schematically illustrating an example of a configuration of an information processing system according to the first example embodiment.

FIG. 1 is a diagram schematically illustrating an example of a configuration of an information processing system 1000. The information processing system 1000 includes, for example, a user terminal 100 and a server 200. The user terminal 100 and the server 200 are communicably connected. The configuration example of the information processing system 1000 is not limited to this example, and a different device may be further included.

The user terminal 100 is a terminal operated by a user. For example, the user terminal 100 may be a smartphone, a tablet terminal, a laptop personal computer, or the like. The server 200 is, for example, a device that provides a service. For example, the server 200 provides a service to the registered user. For example, information about the user is input to the user terminal 100 by the user's operation. For example, the user terminal 100 transmits information about the user to the server. Then, the server 200 performs user registration, for example, by registering information about the user. The service in the present disclosure indicates, for example, exchange between a private company or a public institution and a user using the user terminal 100. For example, the service is a store visit reservation in a restaurant, a retail store, or the like, an order of a product, a settlement, or the like, but is not limited to this example.

The user terminal 100 is equipped with certificate information that is information associated with a user's public certificate. The public certificate indicates a document that has information such as the user's name and date of birth and is capable of identity verification. For example, the public certificate may be a My Number Card, a driver's license, or the like. The certificate information is information about a public certificate. The certificate information may include, for example, information indicating a name, a date of birth, a gender, an address, and the like described in the public certificate. The certificate information may include a personal number of the My Number Card, a license number of a driver's license, and the like.

The certificate information is associated with biometric information that is information about a living body of the user. The biometric information is information used in biometric authentication described later. The biometric information may be, for example, information indicating the feature amount of the living body of the user or an image in which the living body of the user appears, but the biometric information is not limited to this example. Examples of the living body include the user's face, iris, fingerprint, palm print, vein, and the like. The biometric information may be included in the certificate information, or may be stored in the user terminal 100 or another device in association with the certificate information.

Figure 2:
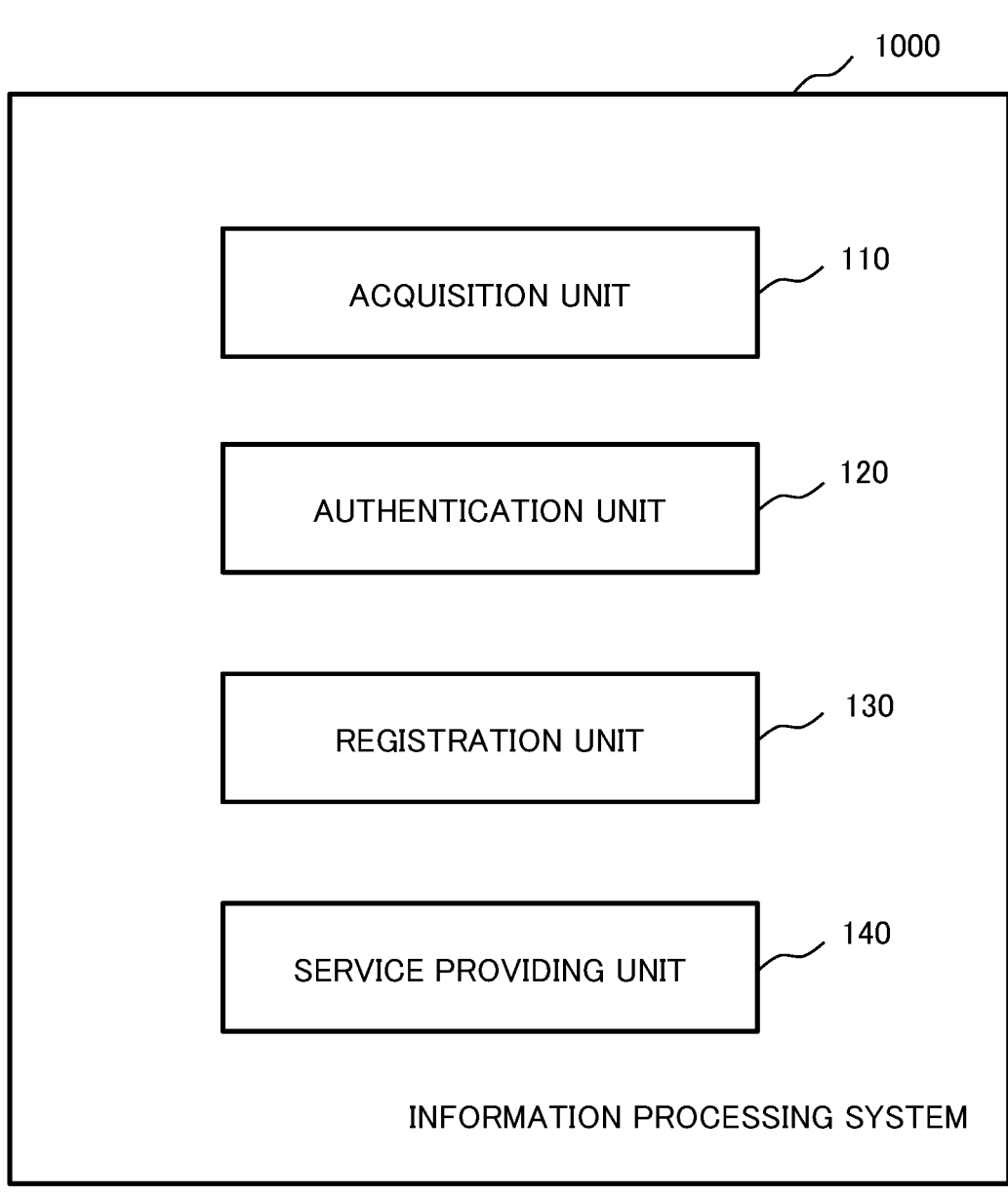
FIG. 2 is a block diagram illustrating an example of a functional configuration of the information processing system according to the first example embodiment.

FIG. 2 is a block diagram illustrating an example of a functional configuration of the information processing system 1000. As illustrated in FIG. 2, the information processing system 1000 includes an acquisition unit 110, an authentication unit 120, a registration unit 130, and a service providing unit 140.

The acquisition unit 110 acquires the biometric information read by the user terminal 100 and the biometric information associated with the certificate information. In the present disclosure, the biometric information read by the user terminal 100 is referred to as first biometric information, and the biometric information associated with the certificate information is referred to as second biometric information. For example, it is assumed that a camera is provided in the user terminal 100. In this case, for example, the face of the user is imaged by the camera of the user terminal 100. Then, the acquisition unit 110 may acquire, for example, a captured image in which the user's face appears as the first biometric information. For example, it is assumed that the user terminal 100 includes a sensor that reads a fingerprint. In this case, the acquisition unit 110 may acquire, for example, a fingerprint image read by the sensor or information indicating a feature amount of the fingerprint as the first biometric information. Then, the acquisition unit 110 acquires the second biometric information associated with the certificate information. In this manner, the acquisition unit 110 acquires the first biometric information that is information about the living body of the user, the information being read by the user terminal 100 equipped with the certificate information that is the information about a public certificate of the user, and the second biometric information that is information about the living body of the user, the information being associated with the certificate information. The acquisition unit 110 is an example of an acquisition means.

The authentication unit 120 performs biometric authentication. For example, the authentication unit 120 performs face authentication on the user. In this case, for example, the first biometric information is an image in which the user's face appears, and the second biometric information is an image of a face image of a public certificate. For example, the authentication unit 120 extracts the feature amount of the face from each image and collates the extracted feature amount. For example, it is assumed that the first biometric information is a feature amount of a face extracted from an image in which a user's face appears, and the second biometric information is a feature amount of a face extracted from an image of a face image of a public certificate. In this case, the authentication unit 120 collates the first biometric information with the second biometric information, for example. In a case where the collation is matched, the authentication unit 120 determines that the user who operates the user terminal 100 is a person of a public certificate (that is, the authentication unit 120 authenticates the user). The method of authenticating the user is not limited to this example. In this manner, the authentication unit 120 performs biometric authentication on the user based on the first biometric information and the second biometric information. The authentication unit 120 is an example of an authentication means.

The registration unit 130 registers information about the user. For example, the registration unit 130 receives an input of information about the user from the user authenticated by the authentication unit 120. The information about the user is, for example, personal information input for the user to receive a service. For example, the information about the user is the user's name, age, gender, address, email address, telephone number, credit card information, and the like. Then, the registration unit 130 registers the input information about the user. In this manner, the registration unit 130 registers the information about the user authenticated by the biometric authentication. The registration unit 130 is an example of a registration means.

The service providing unit 140 provides a service. For example, it is assumed that the user orders a product using the user terminal 100 in a restaurant. At this time, for example, the user terminal 100 makes a request related to an order of a product to the server 200. For example, the server 200 receives an order from the user terminal 100 and notifies the terminal of the store in the restaurant of the order. For example, the user makes a settlement for a product using the user terminal 100 in a restaurant. At this time, for example, the user terminal 100 makes a request related to the settlement of the product to the server 200. For example, the server 200 receives a settlement request from the user terminal 100 and completes the settlement. In this manner, in a case where the information about the user is registered, the service providing unit 140 provides a service to the user in response to a request from the user terminal. The service providing unit 140 is an example of a service providing means.

Next, an example of an operation of the information processing system 1000 will be described with reference to FIG. 3. In the present disclosure, each step in the flowchart is represented using a number assigned to each step, such as "S1".

Figure 3:
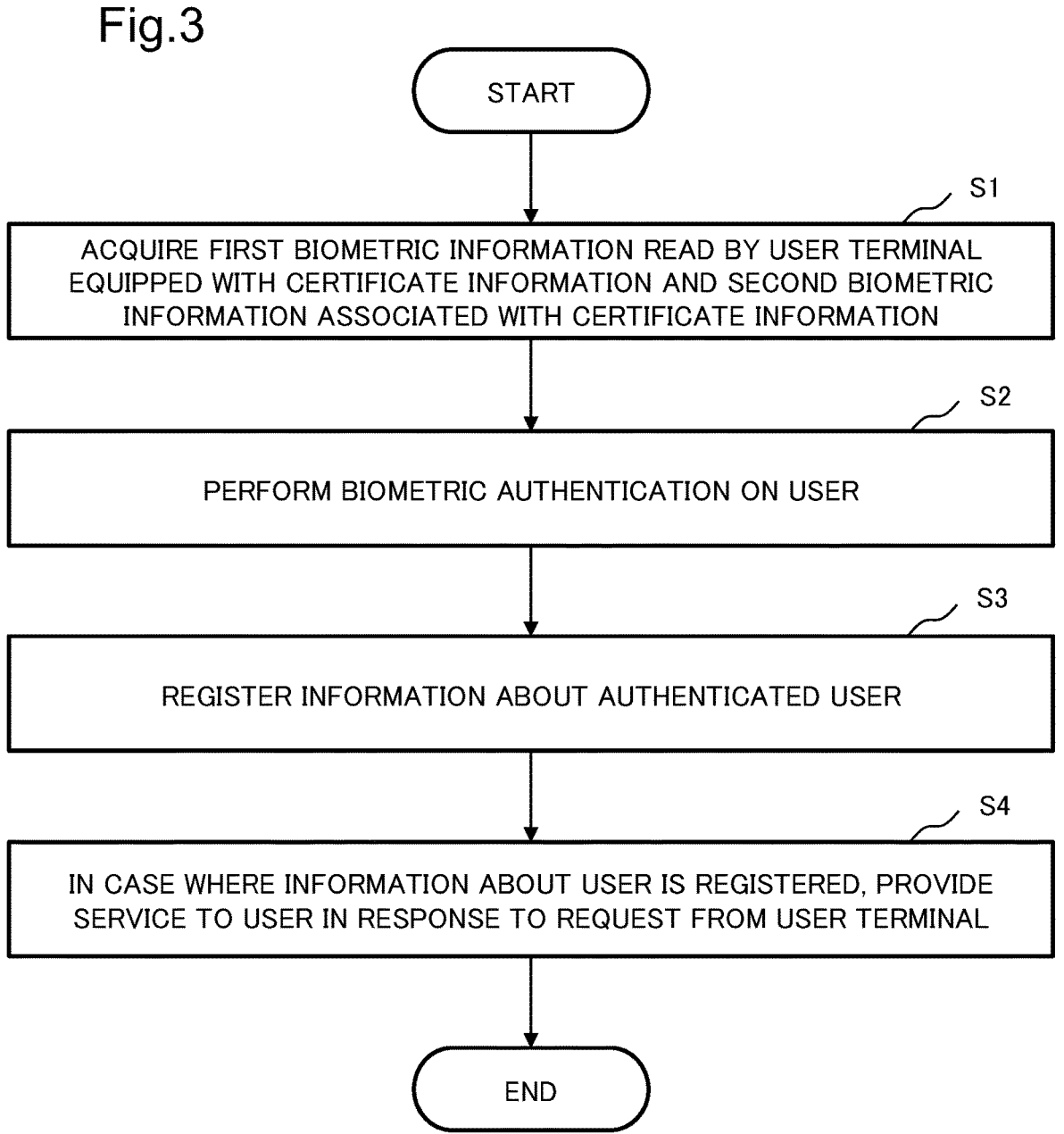
FIG. 3 is a flowchart illustrating an example of an operation of the information processing system of the first example embodiment.

FIG. 3 is a flowchart illustrating an example of the operation of the information processing system 1000. The acquisition unit 110 acquires the first biometric information read by the user terminal equipped with the certificate information and the second biometric information associated with the certificate information (S1). The authentication unit 120 performs biometric authentication on the user based on the first biometric information and the second biometric information (S2). The registration unit 130 registers information about the user authenticated by the biometric authentication (S3). In a case where the information about the user is registered, the service providing unit 140 provides a service to the user in response to a request from the user terminal (S4).

As described above, the information processing system 1000 according to the first example embodiment acquires the first biometric information that is information about the living body of the user, the information being read by the user terminal equipped with the certificate information that is the information about the public certificate of the user, and the second biometric information that is information about the living body of the user, the information being associated with the certificate information. The information processing system 1000 performs biometric authentication on the user based on the first biometric information and the second biometric information, and registers information about the user authenticated by the biometric authentication. Then, in a case where the information about the user is registered, the information processing system 1000 provides a service to the user in response to a request from the user terminal.

At the time of user registration, the information processing system 1000 authenticates a user who owns a user terminal equipped with certificate information that is information about a public certificate of the user. Therefore, the user is required to use the user terminal on which the certificate information is mounted when performing the user registration. As a result, the information processing system 1000 performs authentication corresponding to the belongings authentication of the user. Further, the information processing system 1000 performs biometric authentication on the user using the biometric information read by the user terminal. That is, the information processing system 1000 authenticates the user using both the belongings authentication and the biometric authentication. The information processing system 1000 performs authentication based on information from the user terminal at the time of authentication of the user. In other words, the information processing system 1000 does not require the user to operate the plurality of devices at the time of user registration. That is, the information processing system 1000 according to the first example embodiment can strictly confirm the identity verification of the user when using the service while suppressing the burden on the user.

Second Example Embodiment

Next, an information processing system 1000 according to the second example embodiment will be described. In the second example embodiment, the information processing system 1000 described in the first example embodiment will be described in more detail. Description overlapping with the first example embodiment will be partially omitted.

Figure 4:
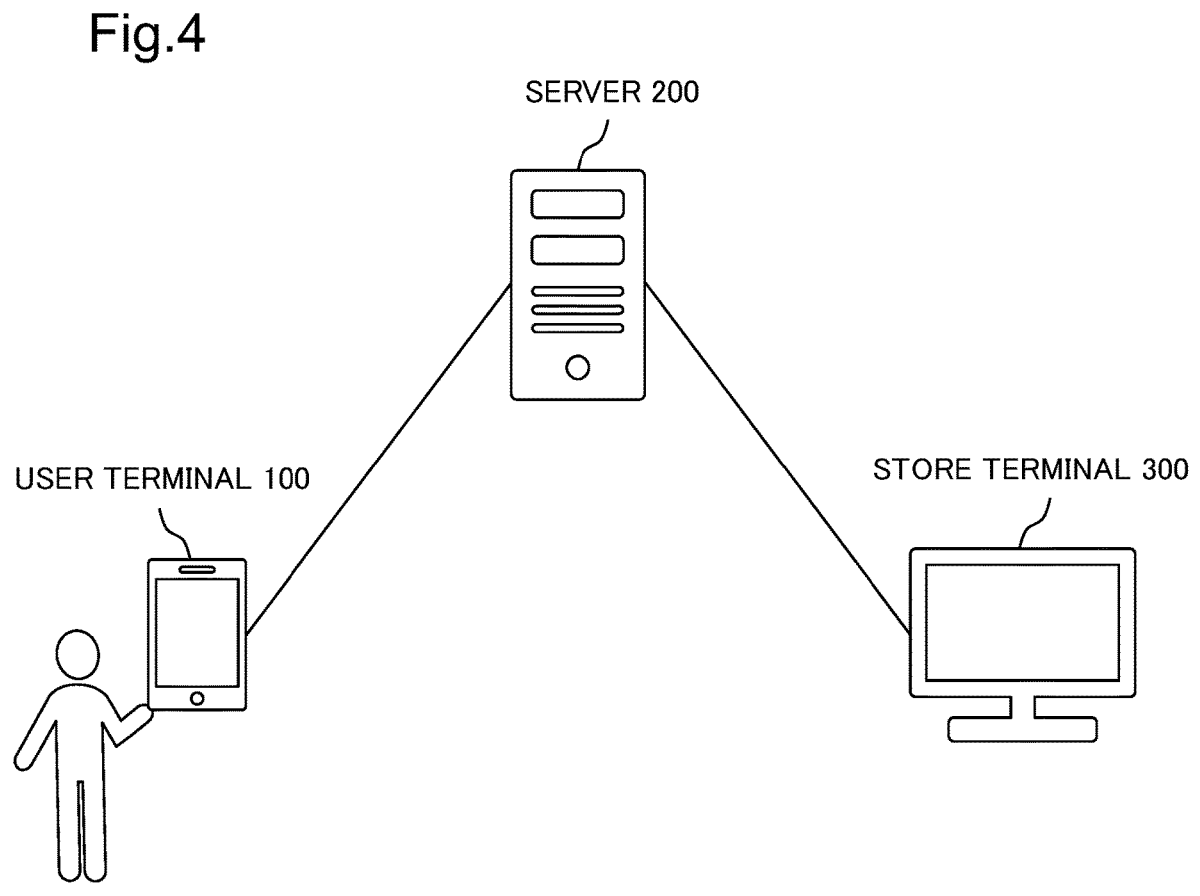

FIG. 4 is a diagram schematically illustrating an example of a configuration including the information processing system 1000 according to the second example embodiment. As illustrated in FIG. 4, the user terminal 100 is communicably connected to the server 200. The server 200 is communicably connected to a store terminal 300. The user terminal 100 is a device used by a user who wants to use a service. The server 200 is a device for a service provider (a company, a public institution, or the like) to provide a service. The store terminal 300 is a terminal existing in a facility such as a restaurant, a retail store, a government office, or a hospital. The store terminal 300 may be a personal computer, a smartphone, a tablet terminal, or the like. There may be a plurality of store terminals 300, and each of the plurality of store terminals 300 may have a different function. The store terminal 300 may be connected to other devices such as a camera and a two-dimensional code reader. In the present embodiment, an example in which the information processing system 1000 is applied to a restaurant will be described, but a scene in which the information processing system 1000 is applied is not limited to this example.

[Details of Information Processing System 1000]

Figure 5:
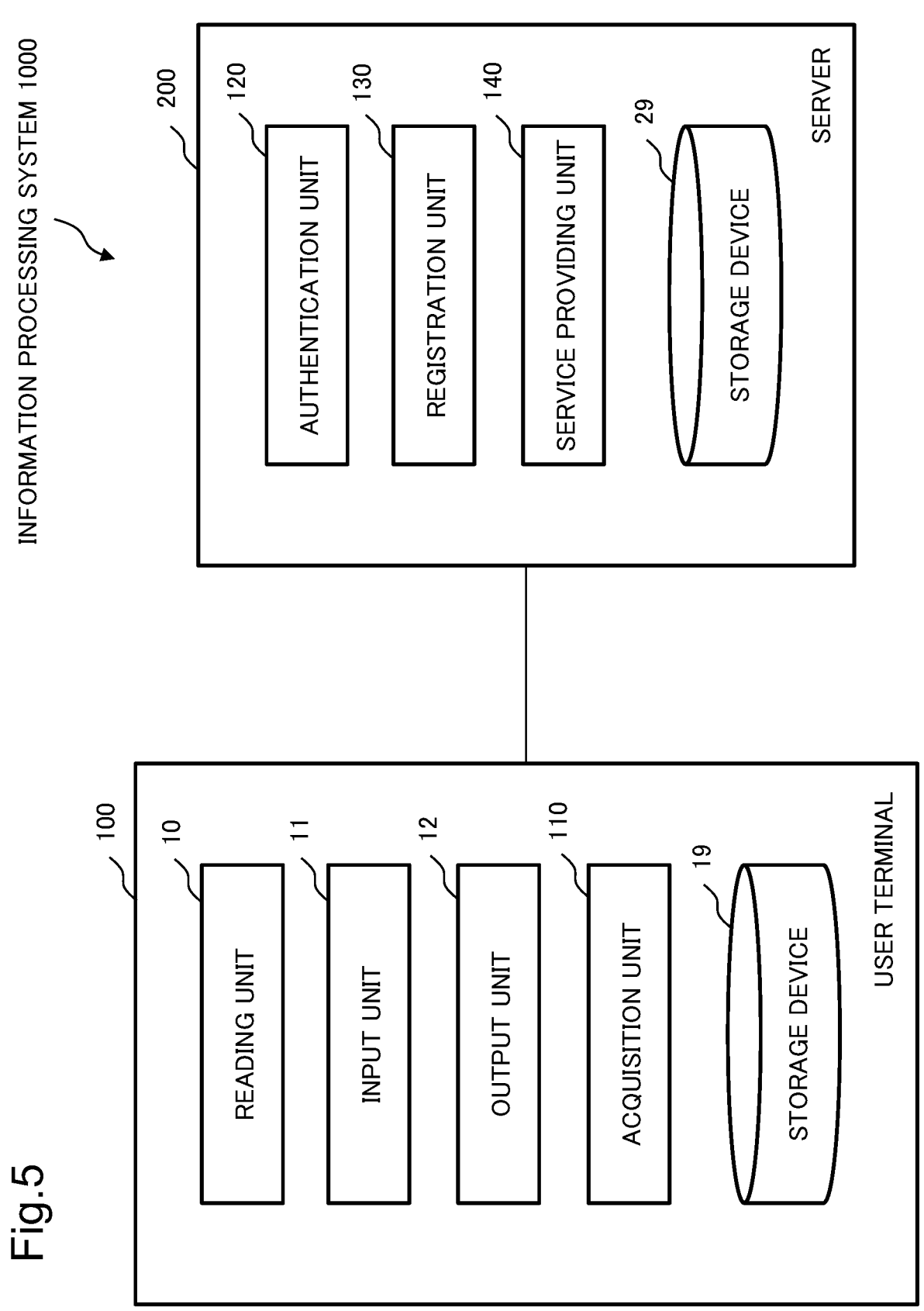
FIG. 5 is a block diagram illustrating an example of a configuration of the information processing system according to the second example embodiment.

FIG. 5 is a block diagram illustrating an example of a configuration of the information processing system 1000 according to the second example embodiment. First, the user terminal 100 will be described. As illustrated in FIG. 5, the user terminal 100 includes a reading unit 10, an input unit 11, an output unit 12, and the acquisition unit 110. The user terminal 100 includes a storage device 19.

The reading unit 10 reads the living body of the user. For example, reading unit 10 captures an image and generates the captured image. In this case, the reading unit 10 has, for example, a function of a camera mounted on the user terminal 100. That is, in the present disclosure, capturing an image of a user is also expressed as "reading". Not limited to this example, the reading unit 10 reads a living body such as an iris, a fingerprint, a palm print, and a vein of the user. In the second example embodiment, an example will be described in which the information processing system 1000 images a user's face in the reading unit 10 and performs face authentication in the authentication unit 120. An example of performing another biometric authentication will be described later.

The input unit 11 receives various inputs according to a user's operation. For example, the input unit 11 receives an input of the above-described information about the user.

The output unit 12 outputs various types of information. For example, information transmitted from the server 200 is displayed on a display mounted on the user terminal 100.

The acquisition unit 110 acquires the first biometric information and the second biometric information associated with the certificate information. Specifically, the acquisition unit 110 acquires the captured image captured by the reading unit 10 as the first biometric information. Then, the acquisition unit 110 acquires the second biometric information about the certificate information that is information about the public certificate of the user. The public certificate may be a document including personal information about the user and issued by a government office. For example, the public certificate is a My Number Card. Not limited thereto, the public certificate may be a driver's license, a national health insurance card, a passport, a resident basic ledger card, a residence card, or the like. The certificate information is information indicating validity of the public certificate, and may be an electronic certificate issued from an external certificate authority or the like. Among cards including an integrated circuit (IC) chip such as a My Number Card, there is a card that can be used when an electronic certificate is mounted on the IC chip. That is, the user terminal 100 equipped with the electronic certificate is a terminal having a function of a public certificate. A terminal having such a function of a public certificate may be referred to as a public certificate integrated terminal. For example, the user terminal 100 equipped with a My Number Card electronic certificate has a My Number Card function and is sometimes referred to as a My Number Card integrated terminal.

The second biometric information that is the biometric information about the user is associated with the certificate information. As described above, the second biometric information is used when biometric authentication is performed. The second biometric information may be an image in which part of the user appears, or may be information indicating a feature amount of part of the user. The second biometric information may be, for example, a face image included in the public certificate. The second biometric information may be associated with the certificate information or may be included in the certificate information. In the present embodiment, the certificate information and the second biometric information are associated with each other and stored in the storage device 19. The storage device 19 is an example of a storage means.

The acquisition unit 110 may acquire the second biometric information in a case where authentication with a predetermined password is performed. For example, in a case where the user attempts to access the certificate information about the user terminal 100, the output unit 12 requests input of a password. At this time, the output unit 12 displays a request for a password on the display of the user terminal 100. Then, the input unit 11 receives an input of a password from the user. The password may be an identification number called, for example, a personal identification number (PIN) code. For example, in a case where the input password matches the setting information, the acquisition unit 110 can access the certificate information and acquires the second biometric information associated with the certificate information. The setting information is information indicating a preset password. The setting information is stored in the storage device 19, for example. In this manner, the acquisition unit 110 may acquire the second biometric information in a case where the password input by the user matches the preset setting information.

Next, the server 200 will be described. The server 200 includes the authentication unit 120, the registration unit 130, and the service providing unit 140. The server 200 includes a storage device 29. The storage device 29 is an example of a storage means.

The authentication unit 120 authenticates the user. Specifically, for example, the authentication unit 120 acquires the first biometric information and the second biometric information from the user terminal 100. Then, the authentication unit 120 performs biometric authentication based on the first biometric information and the second biometric information. The authentication unit 120 may receive selection of an authentication method from the user in advance. For example, in a case where an authentication method different from biometric authentication using certificate information, such as short message service (SMS) authentication, is selected, the authentication unit 120 performs authentication according to the selected authentication method. The authentication method different from the biometric authentication using the certificate information may be an existing method.

The registration unit 130 registers information about the user. FIG. 6 is a diagram illustrating an example of information about a user. In the example of FIG. 6, the information about the user includes identification information, name, gender, date of birth, address, email address, and credit card information about the user. The identification information is information different for each user, and is information for identifying the user. Furthermore, in the example of FIG. 6, the information about the user includes information indicating the captured image of the user and the authentication level. In a case where the user is authenticated by the biometric authentication using the certificate information, the registration unit 130 may register the first biometric information used for the biometric authentication as the information about the user. In a case where the face authentication is performed as the biometric authentication, the first biometric information to be registered is, for example, a captured image in which the face of the user appears. The biometric information registered at this time is also referred to as registration biometric information. The registration unit 130 may register information about the user of the user who has been authenticated by an authentication method different from the biometric authentication using the certificate information and the user who has not been authenticated. At this time, the information about the user includes information indicating an authentication method performed on the user. In the present disclosure, information indicating the type of authentication performed on the user is also referred to as an authentication level. For example, the registration unit 130 sets the user authenticated by the biometric authentication using the certificate information as the authentication level 2, sets the user authenticated by another authentication as the authentication level 1, and sets the user not authenticated as the authentication level 0, and registers the information about the user. In the example of FIG. 6, information about authentication level 2 indicating the user authenticated by the biometric authentication using the certificate information is registered. The information about the user is stored in the storage device 29, for example.

The service providing unit 140 provides a service using the user terminal 100. For example, in the case of a restaurant, the service providing unit 140 performs services such as store visit reservation, product order, a settlement, and point granting in response to a request from the user terminal 100. For example, it is assumed that the user makes a request for store visit reservation using the user terminal 100. The request for the store visit reservation may include information such as identification information about the user, reservation date and time, and the number of people for reservation. In this case, the service providing unit 140 receives the reservation in response to the request and generates the reservation code. Then, the service providing unit 140 transmits the reservation code to the user terminal 100. The reservation code is information indicating that the user is a user who made a reservation. For example, the reservation code may be data obtained by converting information about a store visit reservation including information about a user who made a reservation, a reservation date and time, the number of reservation persons, and the like. For example, the user can display the reservation code on the user terminal 100 and cause the store terminal 300 to read the reservation code, thereby proving that the user himself/herself is a user who made a reservation. The reservation code may be, for example, a one-dimensional barcode or a two-dimensional barcode. A customer who has made a reservation at a restaurant or the like may not come to the store without canceling the reservation. This is referred to as reservation escape. The reservation escape causes damage to the restaurant. The information processing system 1000 receives a store visit reservation from a user who has been subjected to strict identity verification, so that it is possible to suppress reservation escape by the user.

For example, it is assumed that the user requests an order of a product using the user terminal 100. The service providing unit 140 receives an order and presents order information, which is information about the ordered product, to the store terminal 300 used by an employee of the restaurant. As a result, the user can order the product using the user terminal 100. At this time, for example, the service providing unit 140 may set to enable the user of the user terminal 100 to order a product after causing the user terminal 100 to read a code such as a two-dimensional barcode installed on a table where the user is seated or a menu table. At this time, the code includes, for example, information for identifying the table. Then, the request for an order from the user terminal may include information for identifying the table. As a result, the service providing unit 140 can associate the order information with the table to which the product is to be carried.

For example, it is assumed that the user makes a settlement request using the user terminal 100. The settlement request may include, for example, information about the amount to be paid by the user. For example, the input unit 11 may acquire the information about the amount of money by receiving information input by the user. At this time, the input unit 11 may acquire the information about the amount by reading a code such as a two-dimensional code including the information about the amount. The service providing unit 140 makes a settlement process using, for example, credit card information about the user. Then, the service providing unit 140 may notify the user terminal 100 of the settlement completion. The service providing unit 140 may make an empty settlement when an order for a product is placed. That is, the service providing unit 140 may make an empty settlement related to the order in a case where there is a request for the order from the user terminal 100, and may complete the settlement related to the order in a case where there is a request for the settlement from the user terminal 100. In this case, the information about the amount may not be included in the settlement request. Even in a case where there is no settlement request from the user terminal 100, the service providing unit 140 may complete the settlement related to the order in a case where there is no request for order for a predetermined time or more. As a result, the information processing system 1000 can suppress eating and walking out without paying.

The service providing unit 140 may give the user a point corresponding to the amount of money paid. The point is data indicating economic value. The point may be, for example, data indicating a value, similar to money, that can be exchanged for goods or services. The point is included in, for example, information about the user.

In this manner, the information processing system 1000 can reduce the opportunity for the user to face an employee of a restaurant when the user uses the restaurant, for example. As a result, the information processing system 1000 can also contribute to countermeasures against infectious diseases.

Not limited to the above example, the service providing unit 140 provides a service in response to a request from the user terminal 100. The provided service may be set according to an authentication level. FIG. 7 is a diagram illustrating an example of a relationship between an authentication level and a service to be provided. For example, it is illustrated that the user at the authentication level 2 is able to be given a point, make a store visit reservation using the user terminal 100, place an order using the user terminal 100, and make a settlement using the user terminal 100. It is illustrated that the user of the authentication level 1 is able to be given a point and place an order using the user terminal 100. It is illustrated that the user of the authentication level 0 is able to be only given a point. In this manner, the service providing unit 140 may increase available services in stages according to the authentication level. The present invention is not limited thereto, and the service providing unit 140 may provide a service to favor the user according to the authentication level, such as increasing the point to be given according to the authentication level. That is, the service providing unit 140 may set a service that can be provided to the user according to the authentication level.

[Operation 1 of Information Processing System 1000]

Next, an example of the operation of the information processing system 1000 will be described. First, a scene where the information processing system 1000 performs user registration will be described with reference to FIGS. 8 and 9. In the present operation example, it is assumed that the correspondence illustrated in the example of FIG. 7 is used as the correspondence between the authentication level and the authentication method.

Figure 8:
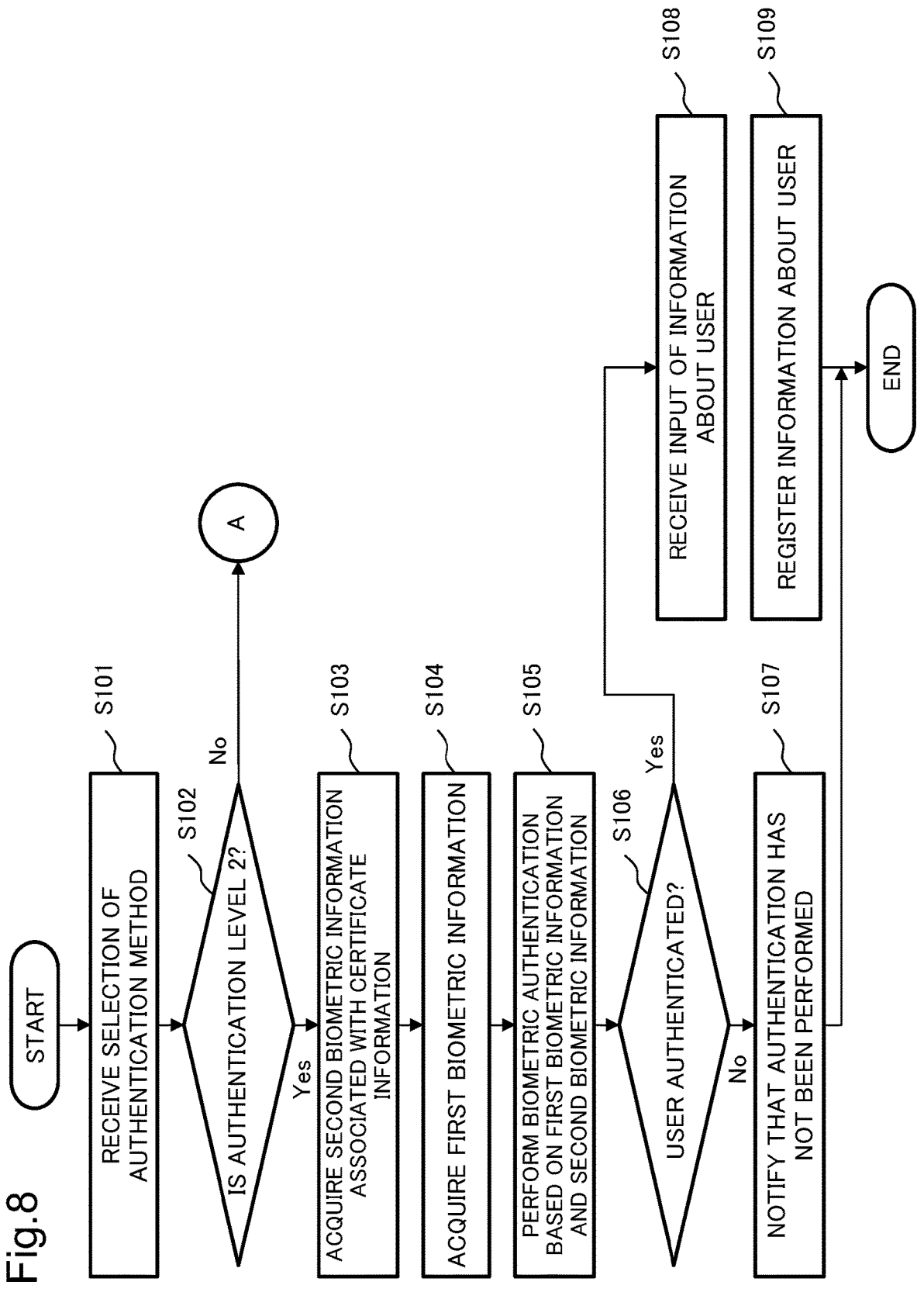
FIG. 8 is a flowchart illustrating an example of user registration operation of the information processing system according to the second example embodiment.

FIG. 8 is a flowchart illustrating an example of user registration operation of the information processing system 1000. First, the authentication unit 120 receives selection of an authentication method (S101). At this time, for example, the output unit 12 of the user terminal 100 displays the authentication level and the authentication method according to the authentication level on the display of the user terminal 100. Then, the input unit 11 receives an input from the user regarding selection of the authentication method. In a case where the authentication level of the selected authentication method is 2 ("Yes" in S102), the acquisition unit 110 acquires the second biometric information associated with the certificate information (S103). At this time, the acquisition unit 110 may acquire the second biometric information in a case where the password input by the user matches the setting information. The acquisition unit 110 acquires the first biometric information (S104). At this time, the acquisition unit 110 acquires, for example, a captured image of the user as the first biometric information. The imaging is performed by the reading unit 10. In a case where the biometric authentication is face authentication, the captured image is a face image of the user. At this time, for example, the output unit 12 may display that the user terminal 100 is operated in such a way that the face can be imaged on the display of the user terminal 100.

Then, the authentication unit 120 acquires the first biometric information and the second biometric information from the user terminal 100, and performs biometric authentication based on the first biometric information and the second biometric information (S105). In a case where the user is not authenticated ("No" in S106), the authentication unit 120 notifies the user terminal 100 that the user is not authenticated (S107). In a case where the user is authenticated ("Yes" in S106), the input unit 11 receives an input of information about the user (S108). At this time, the user terminal 100 transmits the input information to the server 200. The registration unit 130 registers information about the user (S109).

Figure 9:
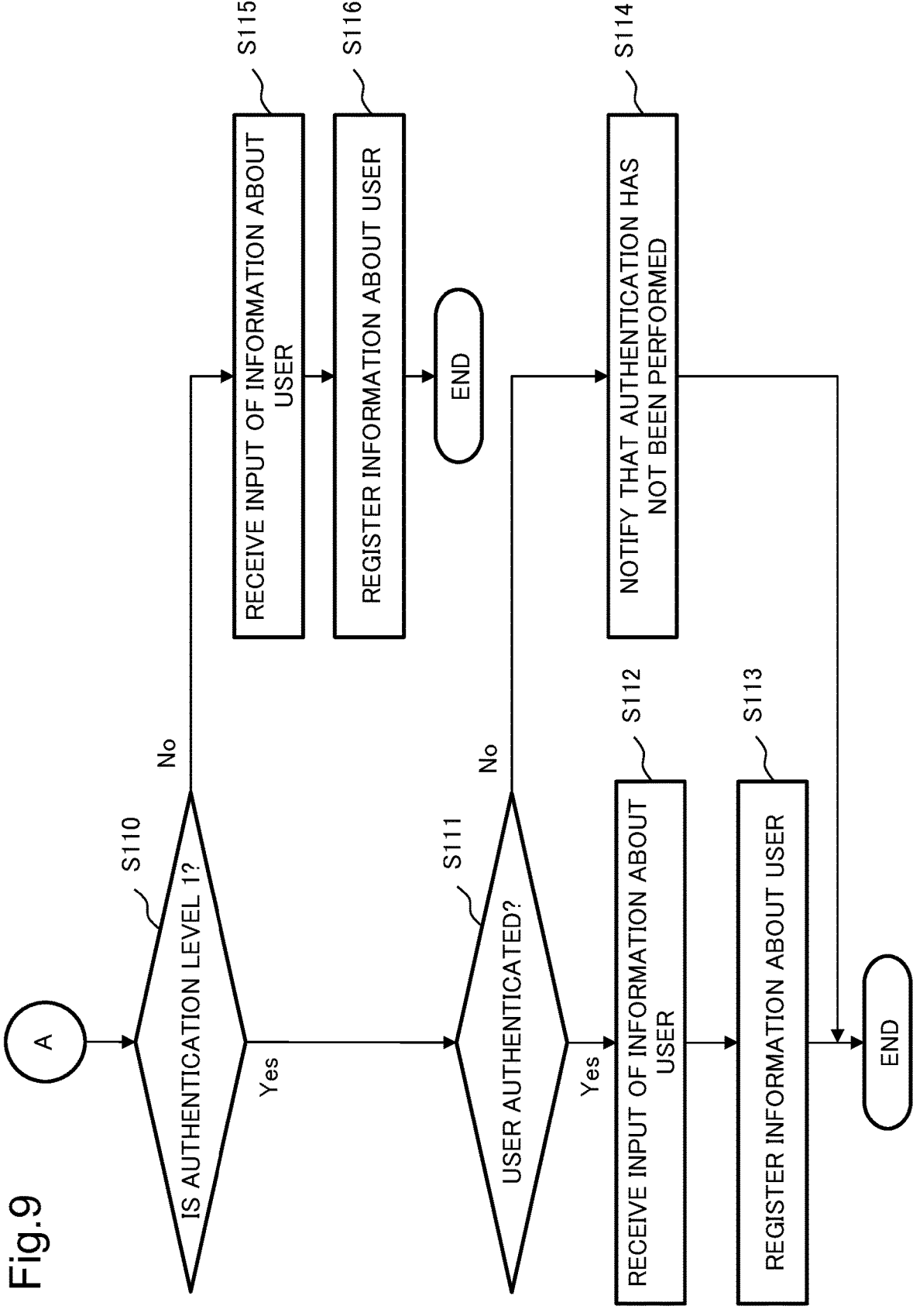
FIG. 9 is a flowchart illustrating an example of continuation of the operation of user registration of the information processing system of the second example embodiment.

In the processing of S102, in a case where the authentication level is not 2 ("No" of S102), the information processing system 1000 proceeds to the operation illustrated in FIG. 9. FIG. 9 is a flowchart illustrating an example of continuation of the user registration operation of the information processing system 1000. In a case where the authentication level of the selected authentication is 1 ("Yes" in S110), the authentication unit 120 performs authentication different from biometric authentication using the certificate information. The authentication method at this time is not particularly limited, and may be an existing method. In a case where the user is not authenticated ("No" in S111), the authentication unit 120 notifies the user terminal 100 that the user is not authenticated (S114). In a case where the user is authenticated ("Yes" in S106), the input unit 11 receives an input of information about the user (S112). Then, the registration unit 130 registers information about the user (S113).

In a case where the authentication level is 0, that is, when authentication is not performed ("No" in S110), the input unit 11 receives an input of information about the user (S112). Then, the registration unit 130 registers information about the user (S113).

[Operation 2 of Information Processing System 1000]

Next, an example of an operation when the information processing system 1000 provides a service will be described with reference to FIGS. 10 to 12. In the present operation example, it is assumed that the user is a user who has performed authentication of the authentication level 2. The present operation example is an operation example in a case where the information processing system 1000 is applied to a restaurant.

Figure 10:
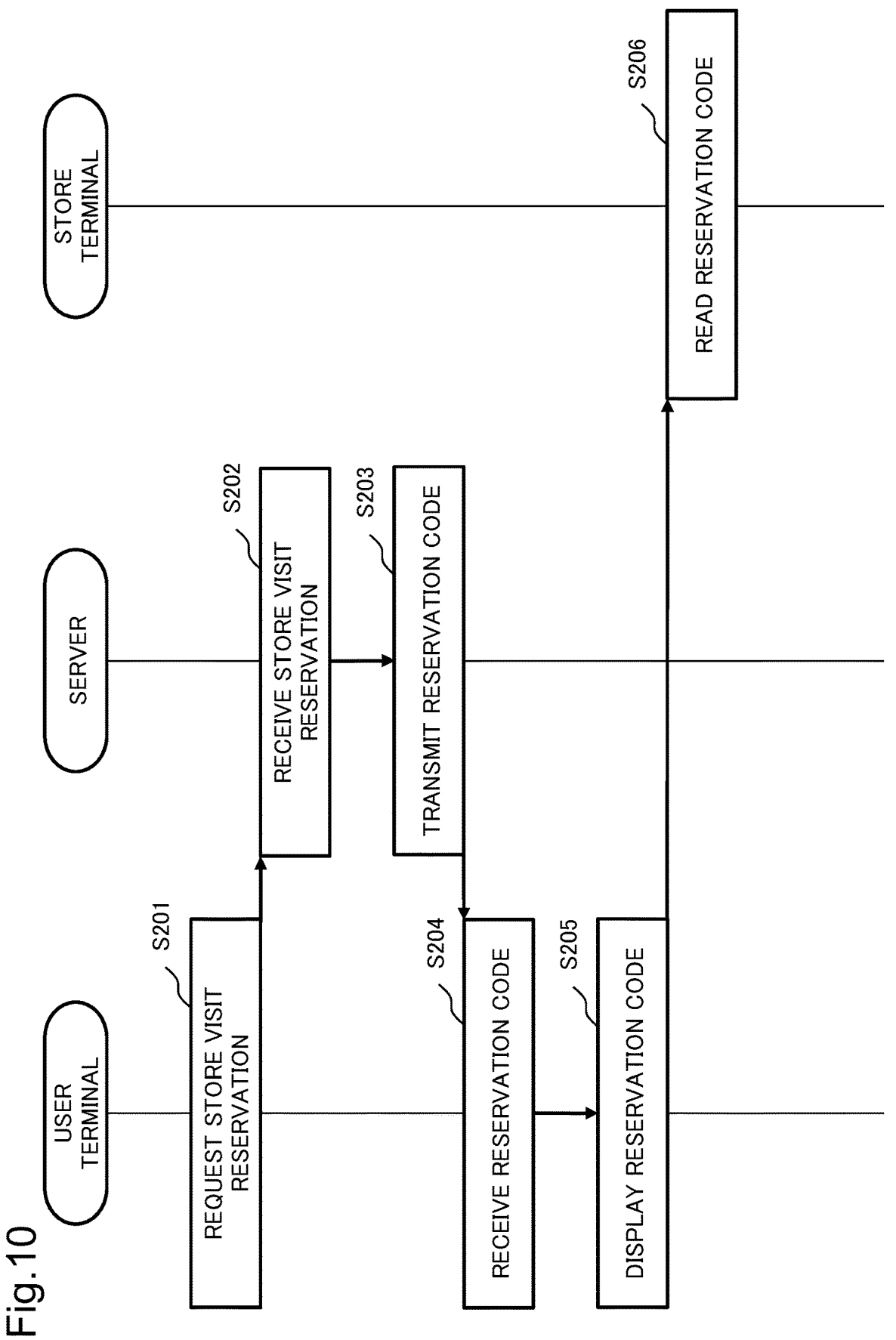
FIG. 10 is a sequence diagram illustrating an example of an operation when the information processing system according to the second example embodiment provides a service for store visit reservation to a user.

FIG. 10 is a sequence diagram illustrating an example of an operation when the information processing system 1000 performs a service of store visit reservation for the user. The user terminal 100 requests a store visit reservation (S201). At this time, for example, the input unit 11 may request the store visit reservation by receiving input of information about the store visit reservation according to the operation of the user and transmitting the information to the server 200. The service providing unit 140 of the server 200 receives a store visit reservation (S202). At this time, the service providing unit 140 may store information about a user who made a reservation, the reservation date and time, the number of reservation persons, and the like in the storage device 29 as the information about the store visit reservation. Then, the service providing unit 140 generates the reservation code to transmit the reservation code to the user terminal 100 (S203). The user terminal 100 receives the reservation code (S204). Then, the output unit 12 of the user terminal displays the reservation code (S205). At this time, for example, when the user visits a restaurant, the user operates the user terminal 100 to present a reservation code. The store terminal 300 reads the reservation code (S206). As a result, the store terminal 300 can confirm that the user who has visited the store is the user who has made the store visit reservation.

Figure 11:
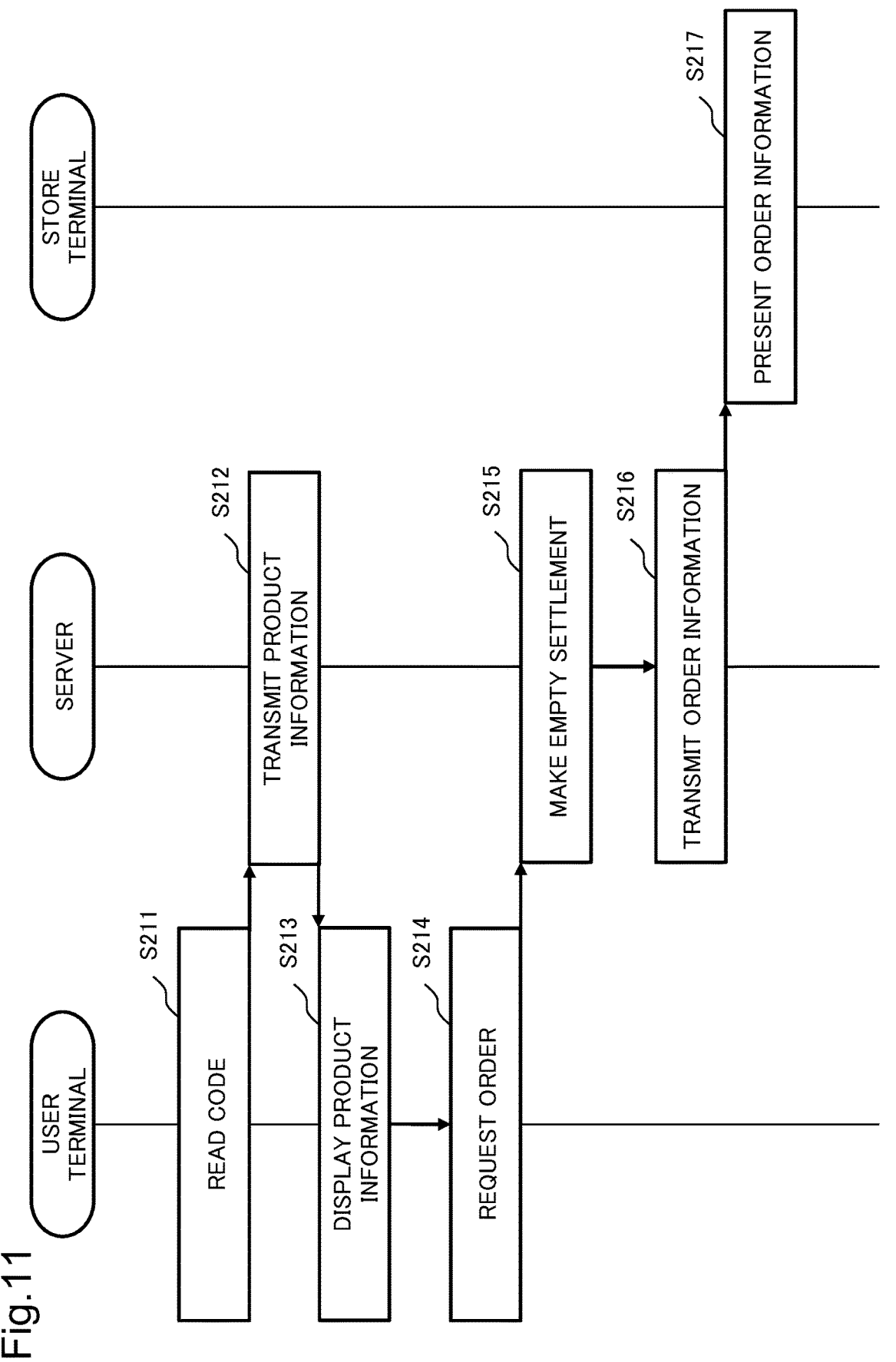
FIG. 11 is a sequence diagram illustrating an example of an operation when the information processing system according to the second example embodiment provides an order service to a user.

FIG. 11 is a sequence diagram illustrating an example of an operation when the information processing system 1000 provides an order service to a user. In this case, the user may not make a store visit reservation as illustrated in the example of FIG. 10. For example, it is assumed that the user is seated at a table of a restaurant. At this time, the user terminal 100 reads the code by the user's operation (S211). For example, the input unit 11 of the user terminal 100 reads a code installed on a table. The service providing unit 140 of the server 200 transmits the product information to the user terminal 100 (S212). The product information is, for example, information indicating a menu of a restaurant. The product information may be stored in advance in the storage device 29. The output unit 12 of the user terminal 100 displays the product information on the display (S213). The user terminal 100 requests an order. At this time, for example, the input unit 11 may request a store visit reservation by receiving an input of an order of a product by a user's operation and transmitting order information including information about the ordered product and information about a table to the server 200. Upon receiving the order information, the service providing unit 140 performs an empty settlement according to the order information (S215). Then, the service providing unit 140 transmits the order information to the store terminal 300 (S216). The store terminal 300 presents the order information (S217). At this time, the store terminal 300 may display the order information on a display or the like, or may print to output the order information. As a result, the employee of the restaurant can confirm the order made by the user using the user terminal 100.

Figure 12:
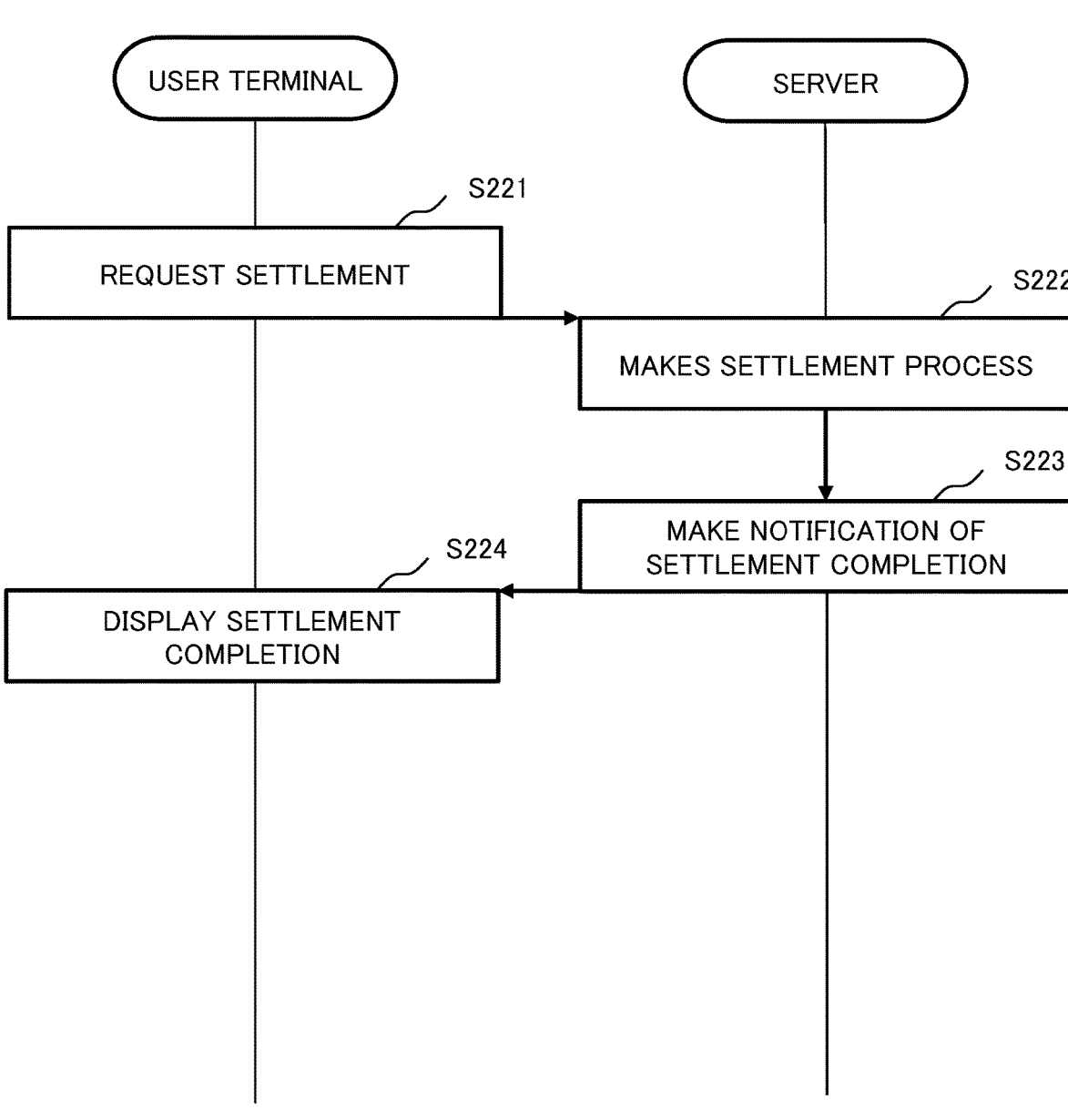
FIG. 12 is a sequence diagram illustrating an example of an operation when the information processing system according to the second example embodiment performs a settlement service to a user.

FIG. 12 is a sequence diagram illustrating an example of an operation when the information processing system 1000 performs a settlement service to the user. In this situation, as illustrated in the example of FIG. 11, it is assumed that an empty settlement related the order is made. The user terminal 100 makes a settlement request (S221). At this time, for example, the input unit 11 may make a settlement request by receiving input of information for making a settlement by user's operation and transmitting the information to the server 200. The service providing unit 140 makes a settlement process (S222). For example, the service providing unit 140 confirms payment with a credit card of the user. At this time, the service providing unit 140 may give the user a point related the amount of money. Then, the service providing unit 140 makes a notification of settlement completion (S223). The output unit 12 of the user terminal 100 displays the completion of the settlement (S224).

As described above, the information processing system 1000 according to the second example embodiment acquires the first biometric information that is information about the living body of the user, the information being read by the user terminal equipped with the certificate information that is the information about the public certificate of the user, and the second biometric information that is information about the living body of the user, the information being associated with the certificate information. The information processing system 1000 performs biometric authentication on the user based on the first biometric information and the second biometric information, and registers information about the user authenticated by the biometric authentication. Then, in a case where the information about the user is registered, the information processing system 1000 provides a service to the user in response to a request from the user terminal.

With this configuration, the information processing system 1000 can request the user to use the user terminal equipped with the certificate information at the time of user registration. That is, the information processing system 1000 can perform both authentication corresponding to the belongings authentication of the user and biometric authentication. The information processing system 1000 performs authentication based on information from the user terminal at the time of authentication of the user. In other words, the information processing system 1000 does not require the user to operate the plurality of devices at the time of user registration. That is, the information processing system 1000 according to the second example embodiment can strictly confirm the identity verification of the user when using the service while suppressing the burden on the user.

The information processing system 1000 according to the second example embodiment may acquire the second biometric information in a case where the password input by the user matches the preset setting information. As a result, the information processing system 1000 can perform authentication corresponding to knowledge authentication. That is, since the information processing system 1000 authenticates the user using the belongings authentication, the knowledge authentication, and the biometric authentication, it is possible to more strictly perform the identity verification of the user.

In the second example embodiment, the information about the user includes an authentication level indicating a type of authentication performed on the user, and the information processing system 1000 registers the information about the user of the user on which biometric authentication has not been performed, and sets a service that can be provided to the user according to the authentication level of the user. As described above, the information processing system 1000 performs user registration even for a user who does not perform biometric authentication using the user terminal equipped with the certificate information. That is, the information processing system 1000 does not uniformly request each of all users to perform all authentication. In addition, since the information processing system 1000 sets the providable service according to the authentication level, it is possible to promote the registration of the user while ensuring appropriate security.

[First Modification]

In the above example, the server 200 performs biometric authentication, but the biometric authentication may be performed by the user terminal 100. That is, the authentication unit 120 that performs biometric authentication may also be included in the user terminal 100.

Figure 13:
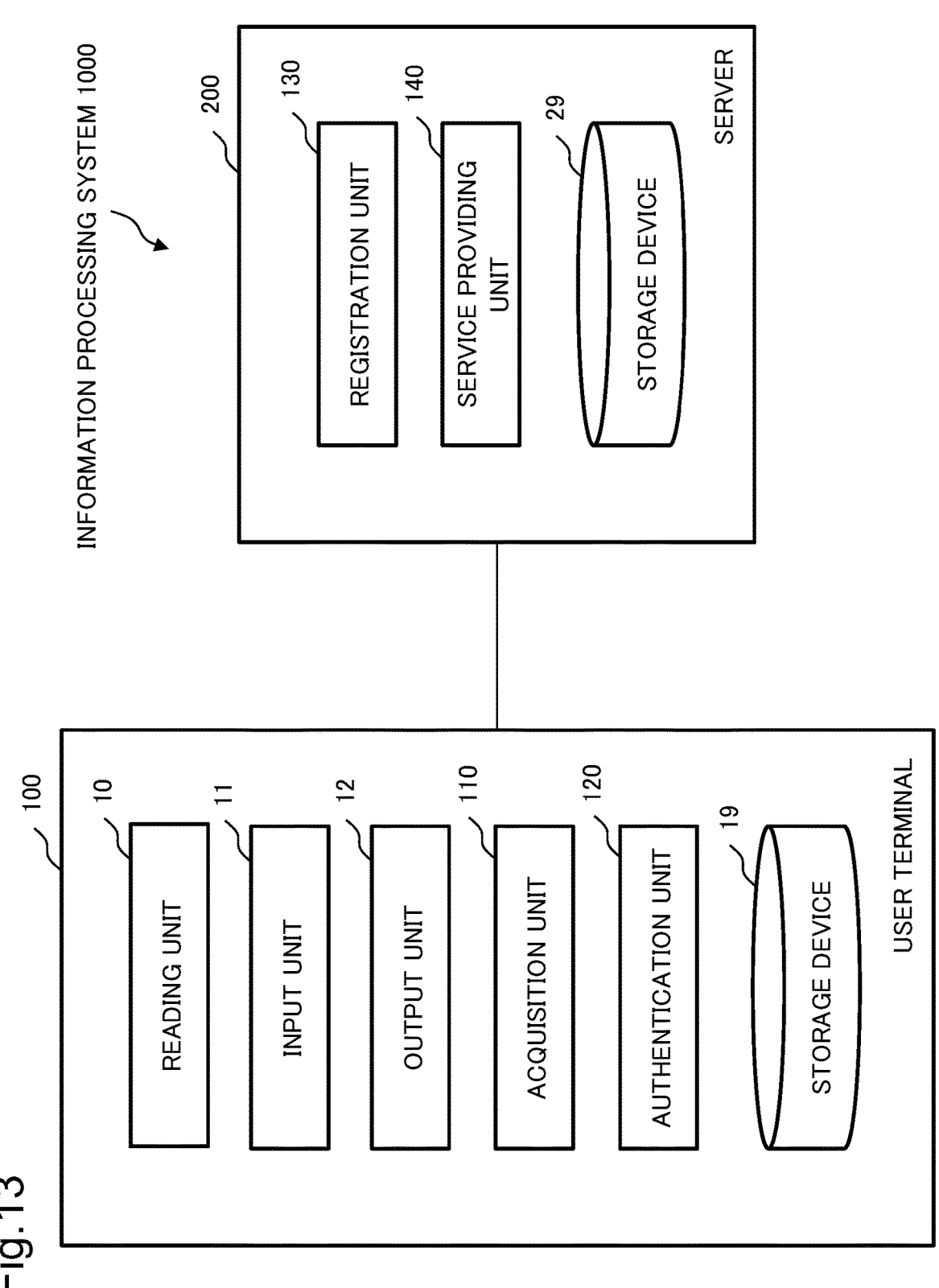
FIG. 13 is a block diagram illustrating an example of a configuration of an information processing system of the first modification.

FIG. 13 is a block diagram illustrating an example of a configuration of an information processing system 1000 of the first modification. As illustrated in FIG. 13, a user terminal 100 of the first modification includes the reading unit 10, the input unit 11, the output unit 12, the acquisition unit 110, and the authentication unit 120. The server 200 of the first modification includes the registration unit 130 and the service providing unit 140.

In this case, the user terminal 100 acquires the first biometric information and the second biometric information. Then, the user terminal 100 performs the biometric authentication based on the first biometric information and the second biometric information. For example, in the processing of S105 of the flowchart of FIG. 8, in the user terminal 100, the authentication unit 120 performs biometric authentication.

[Second Modification]

In the above example, an example in which the face authentication is performed as the biometric authentication has been mainly described, but the biometric authentication is not limited to the face authentication. The living body used for the biometric authentication may be, for example, an iris, a fingerprint, a palm print, a vein, or the like.

For example, in a case where the authentication unit 120 performs iris authentication, the acquisition unit 110 acquires information about the iris. In this case, the reading unit 10 has a function of reading information about the iris. For example, the reading unit 10 may have a function of an infrared camera. That is, the user terminal 100 may include an infrared camera. The acquisition unit 110 acquires the iris image imaged by the infrared camera or the information indicating the feature amount of the iris as the first biometric information. In this case, information indicating the iris image of the user or the feature amount of the iris is associated in advance with the certificate information.

For example, in a case where the authentication unit 120 performs fingerprint authentication, the acquisition unit 110 acquires information about the fingerprint. In this case, the acquisition unit 110 has a function of reading information about the fingerprint. For example, the reading unit 10 may have a function of a camera that images a fingerprint or a function of a sensor that reads a fingerprint. The acquisition unit 110 acquires the fingerprint image generated by the reading unit 10 or the information indicating the feature amount of the fingerprint as the first biometric information. In this case, the fingerprint image of the user or information indicating the feature amount of the fingerprint is associated in advance with the certificate information.

Similarly, in the case of performing the palm print authentication or the vein authentication, the acquisition unit 110 acquires information about the palm print or the vein obtained using the camera or the sensor provided in the user terminal 100.

As described above, the information processing system 1000 of the present disclosure performs biometric authentication using the face, the iris, the fingerprint, the palm print, the vein or the like of the user as a biometric authentication. The acquisition unit 110 may acquire information about a living body obtained from various cameras and sensors provided in the user terminal 100 as the first biometric information according to the authentication method.

[Third Modification]

In the example of FIG. 11, an example of placing an order from the user terminal 100 is described, but the method of placing an order is not limited to this example. For example, in the example of FIG. 11, it is assumed that the store terminal 300 for placing an order is installed on a table. In this case, when the user terminal 100 reads a code including information for identifying a table (S211), the service providing unit 140 sets the store terminal 300 associated with the table in such a way that an order from the user can be placed. The store terminal 300 associated with the table is, for example, a terminal for placing an order installed on a table at which the user is seated. For example, the service providing unit 140 associates the order from the store terminal 300 with the identification information about the user. Then, an order is requested from the store terminal 300 by the user's operation. Then, the information processing system 1000 performs the processing in and after S215.

[Fourth Modification]

The information processing system 1000 may perform biometric authentication when providing a service.

Figure 14:
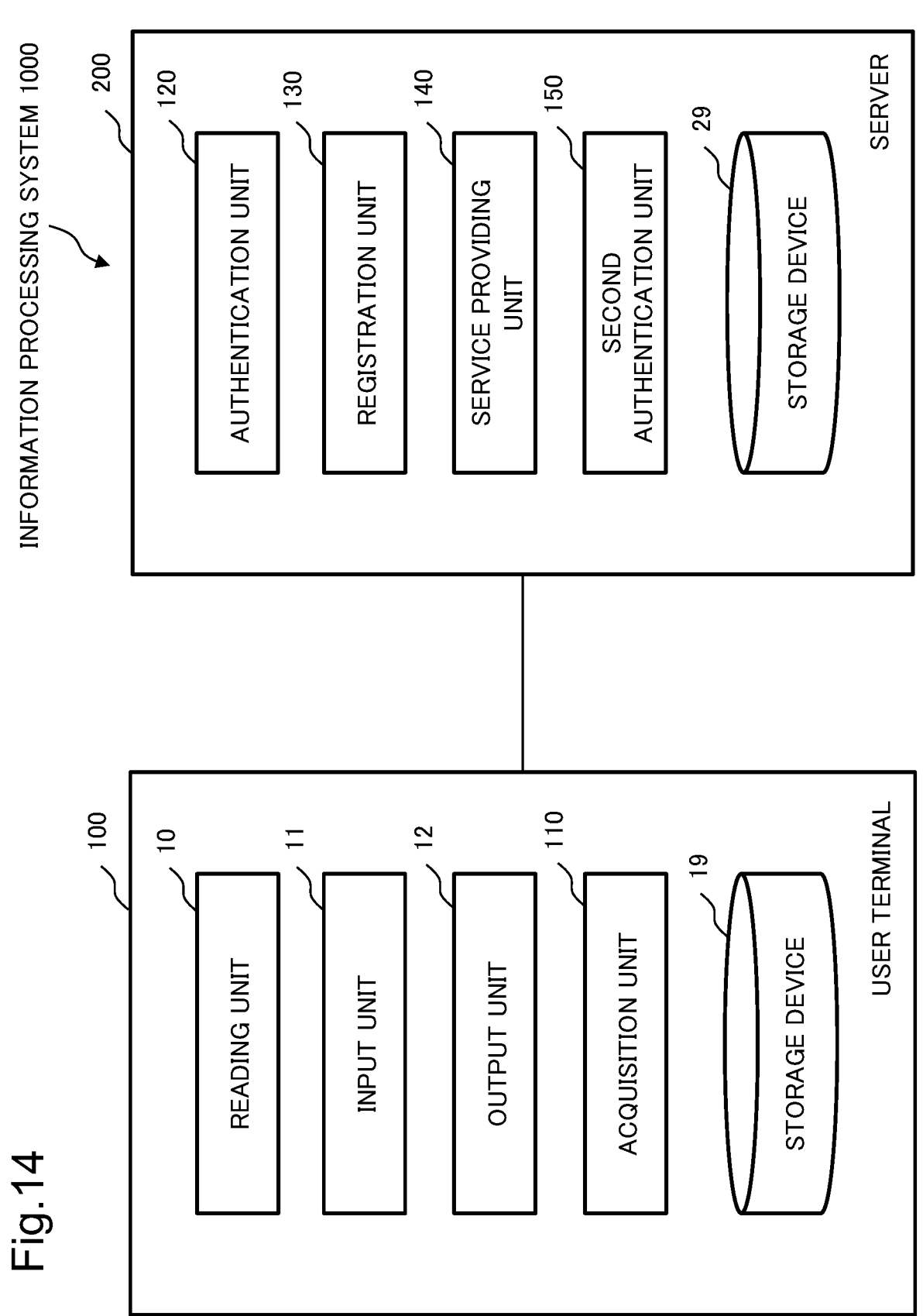
FIG. 14 is a block diagram illustrating an example of a configuration of an information processing system of the fourth modification.

FIG. 14 is a block diagram illustrating an example of a configuration of the information processing system 1000 of the fourth modification. As illustrated in FIG. 14, the server 200 of the third modification includes a second authentication unit 150 in addition to the authentication unit 120, the registration unit 130, and the service providing unit 140.

The second authentication unit 150 performs biometric authentication on the user when there is a request from the user terminal 100. For example, in the example of FIG. 10, it is assumed that the user makes a request for store visit reservation using the user terminal 100 (S201). At this time, the second authentication unit 150 requests the user terminal 100 to read the biometric information. For example, the second authentication unit 150 requests the user terminal 100 to capture an image. The information about the living body of the user generated by the reading requested by the second authentication unit 150 is also referred to as third biometric information. For example, the reading unit 10 of the user terminal 100 captures an image of the user and generates the captured image. The second authentication unit 150 performs biometric authentication based on the third biometric information that is the captured image transmitted from the user terminal 100 and the registration biometric information. In a case where the user is authenticated, the server 200 performs the processing in and after S202 of FIG. 10. In a case where the user is not authenticated, the second authentication unit 150 notifies the user terminal 100 that the user is not authenticated. At this time, the server 200 does not perform the processing in and after S202 of FIG. 10. That is, the second authentication unit 150 performs biometric authentication based on the registration image and the third biometric information that is information about the living body of the user and is read when there is a request from the user terminal 100. The second authentication unit 150 is an example of a second authentication means.

As described above, the information processing system 1000 of the fourth modification performs biometric authentication based on the registration biometric information and the third biometric information that is information about the living body of the user and is read when there is a request from the user terminal. Then, in a case where the user is authenticated by the biometric authentication, the information processing system 1000 provides a service in response to a request from the user terminal. As a result, the information processing system 1000 can perform identity verification even at the time of providing a service, and thus, it is possible to suppress unauthorized use such as impersonation of the user.

For example, in the example of FIG. 10, it is assumed that the store terminal 300 reads the reservation code (S206). At this time, the store terminal 300 may capture an image of the user and generate a captured image (that is, the third biometric information) in which the user appears. In this case, the second authentication unit 150 acquires the third biometric information from the store terminal 300. Then, the second authentication unit 150 performs biometric authentication based on the third biometric information and the registration biometric information. As described above, the second authentication unit 150 may perform biometric authentication using the third biometric information generated in the terminal different from the user terminal 100.

[Fifth Modification]

The information processing system 1000 may provide a service to a plurality of users. For example, it is assumed that the user uses a restaurant with another user different from the user. Then, it is assumed that the user and the another user want to pay the price separately.

In such a case, for example, the input unit 11 of the user terminal 100 receives an input of information about the another user according to an operation of the user. At this time, the input unit 11 may receive the input of the information about the another user by reading the two-dimensional code indicating the information about the another user displayed on the user terminal of the another user. The information about the another user may be information including identification information about the another user, or may be information as illustrated in FIG. 6. Then, the input unit 11 of the user terminal 100 may receive an input of an amount paid by the user and an amount paid by the another user according to an operation of the user. Then, the input unit 11 of the user terminal 100 makes a settlement request including information about the another user and information indicating the amount paid by the user and the amount paid by the another user. Then, the service providing unit 140 performs a settlement process for the amount paid by the user for the user and makes a settlement process for the amount paid by the another user for the another user.

As described above, in a case where the request from the user terminal includes the information about the another user different from the user, the information processing system 1000 of the fifth modification may provide the service to the user and the another user.

[Other Application Examples]

In the above-described example, an example in which the information processing system 1000 is applied to a restaurant has been mainly described, but the information processing system 1000 is also applicable to other scenes.

For example, in a case where the user uses a retail store, the service providing unit 140 may perform services such as a store visit reservation, a product order, a settlement, and point granting in response to a request from the user terminal 100.

Figure 15:
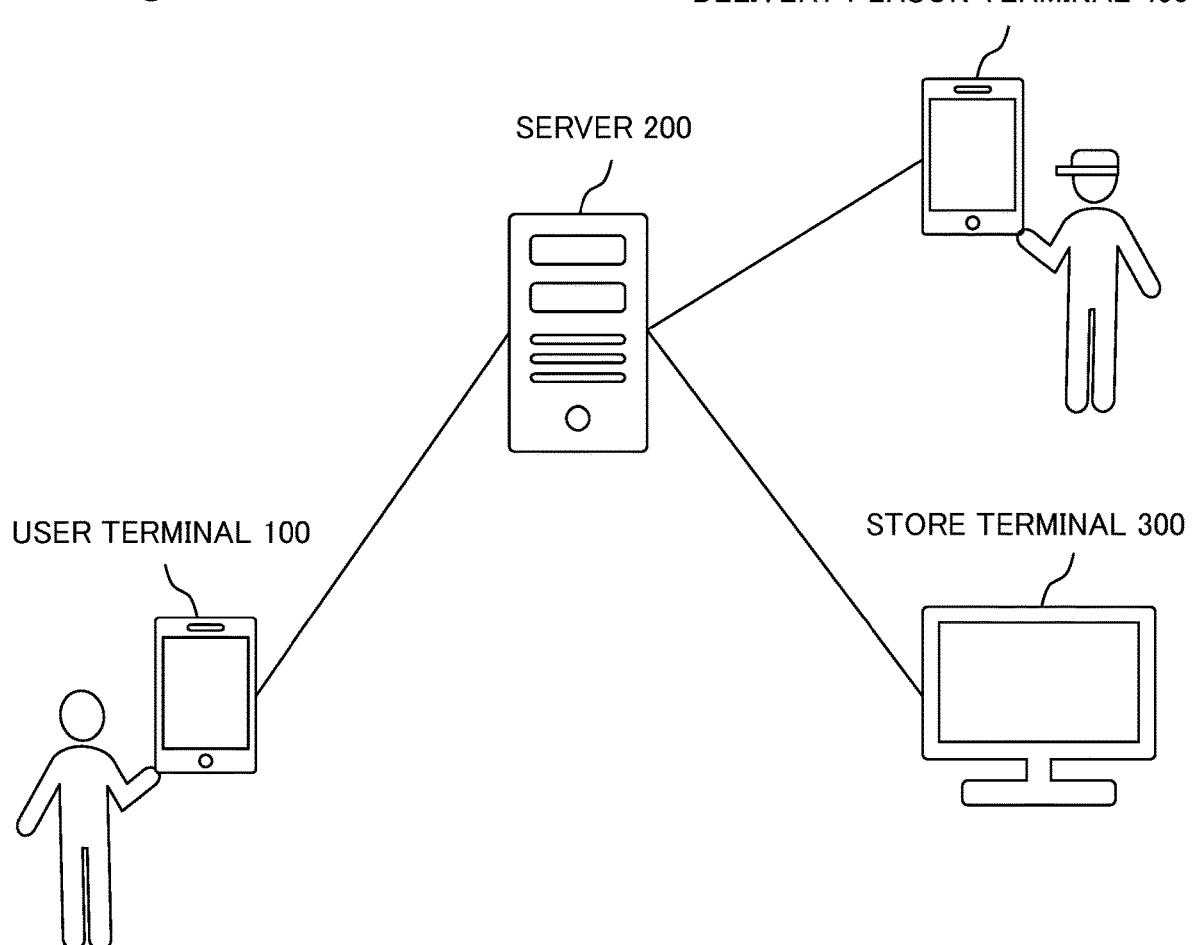
FIG. 15 is a diagram schematically illustrating an example of a configuration of an information processing system in another application example.

The information processing system 1000 is also applicable to a home delivery type restaurant. For example, the service providing unit 140 may perform services such as a product order, a settlement, and point granting in response to a request from the user terminal 100. FIG. 15 is a diagram schematically illustrating an example of a configuration of the information processing system 1000 in another application example. Specifically, FIG. 15 schematically illustrates an example of a configuration of the information processing system 1000 in a case where the information processing system 1000 is applied to a home delivery type restaurant. As illustrated in FIG. 15, the user terminal 100 is communicably connected to the server 200. The server 200 is communicably connected to the store terminal 300 and a delivery person terminal 400. The delivery person terminal 400 is a terminal used by the delivery person who delivers the product. The delivery person terminal 400 may be a portable terminal such as a smartphone and a tablet terminal.

When the user terminal 100 requests an order by the user's operation, the service providing unit 140 performs an empty settlement (S215) to transmit order information to the store terminal 300 (S216), as in the example of FIG. 11. In this manner, the user can order the product using the user terminal 100.

In a case where the delivery person has delivered the product to the user, the user terminal 100 makes a settlement request according to an operation of the user. Then, as in the example of FIG. 12, the service providing unit 140 makes a settlement process (S222) and notifies the user terminal 100 of the settlement completion (S223). The service providing unit 140 may make the settlement process in a case where a settlement request from the user terminal 100 and a notification of delivery completion from the delivery person terminal 400 are made to the server 200. In this case, the delivery person terminal 400 notifies the server 200 of the delivery completion by the operation of the delivery person. As a result, the information processing system 1000 can complete the settlement only in a case where the delivery is reliably performed.

Similarly, the information processing system 1000 is also applicable to home delivery. For example, it is assumed that a payment on delivery is delivered to the user by home delivery. In this case, for example, the operation by the delivery person causes the delivery person terminal 400 to display a two-dimensional barcode including information about the price and the like. When the input unit 11 of the user terminal 100 reads the two-dimensional barcode, the output unit 12 of the user terminal 100 presents information about the price and the like. Thereafter, when the user terminal 100 makes a settlement request by the user's operation, the service providing unit 140 performs the settlement process. Thereafter, the service providing unit 140 may notify the user terminal 100 and the delivery person terminal 400 of the completion of the settlement, for example.

Configuration Example of Hardware of Information Processing System

Figure 16:
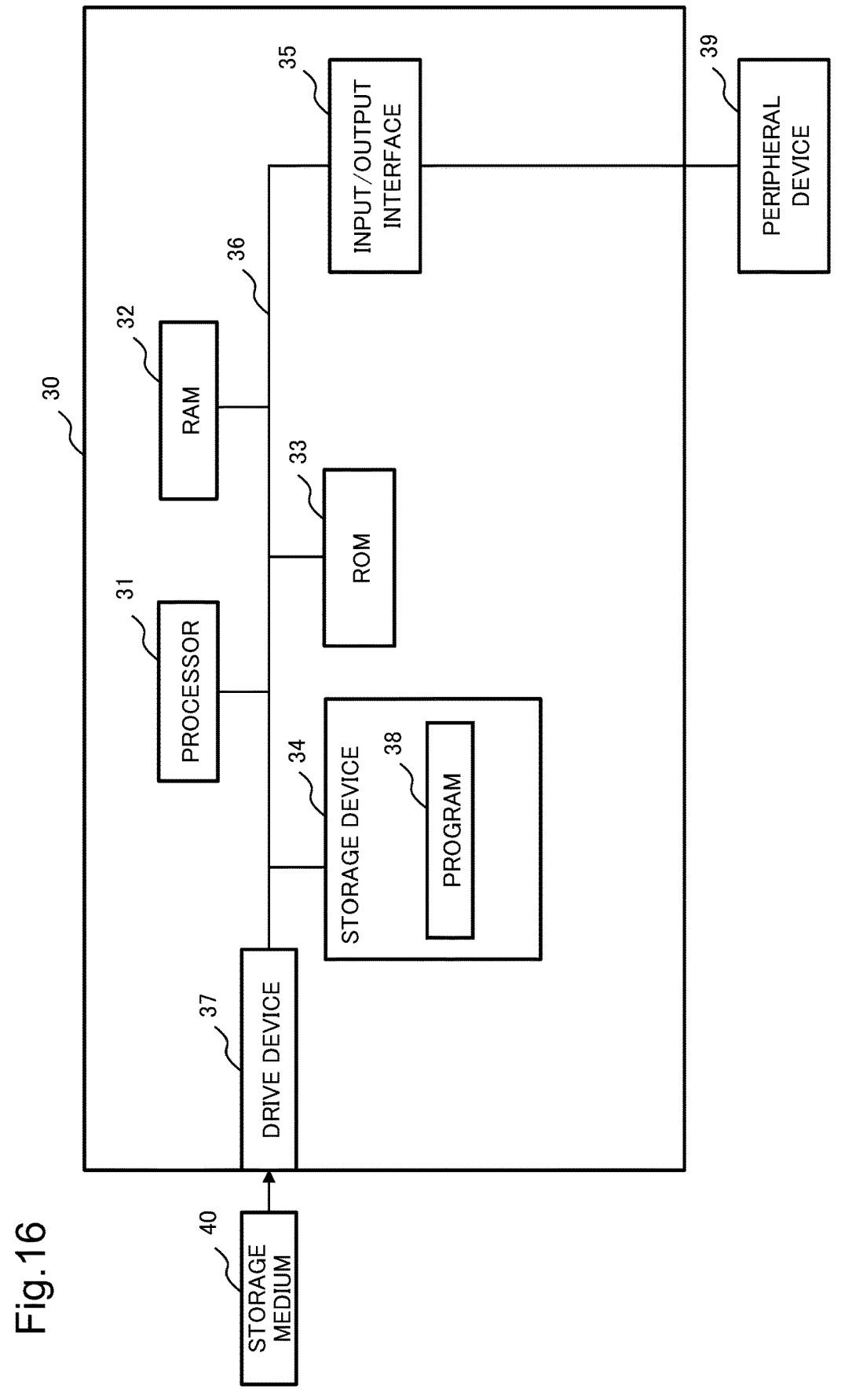
FIG. 16 is a block diagram illustrating an example of a hardware configuration of a computer device that implements the information processing systems according to the first and second example embodiments of the present disclosure.

Hardware constituting the information processing systems of the first and second example embodiments will be described. FIG. 16 is a block diagram illustrating an example of a hardware configuration of a computer device that implements the information processing system according to each example embodiment. In a computer device 30, the information processing system and the information processing method described in each example embodiment and each modification are achieved. For example, each of the user terminal and the server described in each example embodiment and each modification may have the hardware configuration illustrated in FIG. 16.

As illustrated in FIG. 16, the computer device 30 includes a processor 31, a random access memory (RAM) 32, a read only memory (ROM) 33, a storage device 34, an input/output interface 35, a bus 36, and a drive device 37. The information processing system may be implemented by a plurality of electric circuits.

The storage device 34 stores a program (computer program) 38. The processor 31 executes the program 38 of the present information processing system using the RAM 32. Specifically, for example, the program 38 includes a program that causes a computer to execute the processing illustrated in FIGS. 3, 8, 9, 10, 11, and 12. When the processor 31 executes the program 38, the functions of the components of the present information processing system are implemented. The program 38 may be stored in the ROM 33. The program 38 may be recorded in a storage medium 40 and read using the drive device 37, or may be transmitted from an external device (not illustrated) to the computer device 30 via a network (not illustrated).

The input/output interface 35 exchanges data with a peripheral device (keyboard, mouse, display device, etc.) 39. The input/output interface 35 functions as a means configured to acquire or outputting data. The bus 36 connects the components.

There are various modifications of the method of achieving the information processing system. For example, the information processing system can be achieved as a dedicated device. The information processing system can be achieved based on a combination of a plurality of devices.

A processing method for causing a storage medium to record a program for achieving each component in the functions of each example embodiment, reading the program recorded in the storage medium as a code, and a computer executing the program are also included in the scope of each example embodiment. That is, a computer-readable storage medium is also included in the scope of each example embodiment. A storage medium recording the above-described program and the program itself are also included in each example embodiment.

The storage medium is, for example, a floppy (registered trademark) disk, a hard disk, an optical disk, a magneto-optical disk, a compact disc (CD)-ROM, a magnetic tape, a nonvolatile memory card, or a ROM, but is not limited to this example. In addition, the program recorded in the storage medium is not limited to a program that executes processing by itself, and programs that operate on an operating system (OS) to execute processing in cooperation with other software and functions of an extension board are also included in the scope of each example embodiment.

Although the present invention is described above with reference to the example embodiments, the present invention is not limited to the above example embodiments. It will be understood by those of ordinary skill in the art that various changes in form and details may be made therein without departing from the spirit and scope of the present invention as defined by the claims. The above-described example embodiments and modifications can be appropriately combined in various application examples.

This application claims priority based on Japanese Patent Application No. 2021-125258 filed on Jul. 30, 2021, the entire disclosure of which is incorporated herein.

REFERENCE SIGNS LIST 10 reading unit
11 input unit
12 output unit
100 user terminal
110 acquisition unit
120 authentication unit
130 registration unit
140 service providing unit
150 second authentication unit
200 server

What is claimed is:

1. An information processing system comprising:
one or more memories storing instructions; and
one or more processors configured to execute the instructions to:
acquire first biometric information about a living body of a user during an authentication process, the first biometric information being read by a user terminal, the user terminal equipped with certificate information about a public certificate of the user;
acquire second biometric information about a living body of the user during the authentication process, the second biometric information included in the certificate information stored in the user terminal;
perform biometric authentication on the user based on the first biometric information and the second biometric information acquired from the user terminal;
execute the instructions to register the first biometric information as registration biometric information in a case where the user is authenticated by the biometric authentication;
register information about the user authenticated by the biometric authentication; and
provide a service to the user in response to a request from the user terminal in a case where the information about the user is registered.

2. The information processing system according to claim 1,
wherein the one or more processors are configured to execute the instructions to acquire the second biometric information in a case where a password input by the user matches preset setting information.

3. The information processing system according to claim 1,
wherein the one or more processors are further configured to execute the instructions to:
perform an empty settlement related to an order in a case where there is a request for the order from the user terminal; and complete a settlement related to the order in a case where there is a settlement request from the user terminal.

4. The information processing system according to claim 1,
wherein the one or more processors are further configured to execute the instructions to:
register information about the user of the user on which the biometric authentication has not been performed, wherein
the information about the user includes an authentication level indicating a type of authentication performed on the user, and wherein
set the service providable to the user according to the authentication level of the user.

5. The information processing system according to claim 1,
wherein the one or more processors are further configured to execute the instructions to:
perform the biometric authentication based on the registration biometric information and third biometric information that is information about a living body of the user, the third biometric information being read when there is a request from the user terminal; and
provide the service in response to a request from the user terminal in a case where the user is authenticated.

6. The information processing system according to claim 1,
wherein the one or more processors are configured to execute the instructions to provide the service to the user and another user in a case where the request from the user terminal includes information about the another user different from the user.

7. The information processing system according to claim 1, wherein
the public certificate is a My Number Card, and wherein
the certificate information is an electronic certificate indicating validity of the My Number Card.

8. The information processing system according to claim 1, wherein
the biometric authentication is performed within the user terminal.

9. The information processing system according to claim 1, wherein
the biometric authentication is performed using only the user terminal without requiring external server processing.

10. An information processing method comprising:
acquiring first biometric information about a living body of a user during an authentication process, the biometric information being read by a user terminal, the user terminal equipped with certificate information about a public certificate of the user;
acquiring second biometric information about a living body of the user during the authentication process, the second biometric information included in the certificate information stored in the user terminal;
performing biometric authentication on the user based on the first biometric information and the second biometric information acquired from the user terminal;
executing the instructions to register the first biometric information as registration biometric information in a case where the user is authenticated by the biometric authentication;
registering information about the user authenticated by the biometric authentication; and providing a service to the user in response to a request from the user terminal in a case where the information about the user is registered.

11. A non-transitory computer-readable storage medium storing a program for causing a computer to execute:

acquiring first biometric information about a living body of a user during an authentication process, the first biometric information being read by a user terminal, the user terminal equipped with certificate information about public certificate of the user;

acquiring second biometric information about a living body of the user during the authentication process, the second biometric information included in the certificate information stored in the user terminal;

performing biometric authentication on the user based on the first biometric information and the second biometric information acquired from the user terminal;

executing the instructions to register the first biometric information as registration biometric information in a case where the user is authenticated by the biometric authentication;

registering information about the user authenticated by the biometric authentication; and providing a service to the user in response to a request from the user terminal in a case where the information about the user is registered.

\* \* \* \* \*